(12) United States Patent
Buranov

(10) Patent No.: US 7,540,438 B2
(45) Date of Patent: Jun. 2, 2009

(54) PROCESS FOR RECOVERING RUBBER FROM RUBBER-BEARING PLANTS WITH A GRISTMILL

(76) Inventor: Anvar U. Buranov, 101-298 Maple Street, Pentiction, British Columbia (CA) V2A 5V7

( * ) Notice: Subject to any disclaimer, the term of this patent is extended or adjusted under 35 U.S.C. 154(b) by 119 days.

(21) Appl. No.: 11/438,373

(22) Filed: May 23, 2006

(65) Prior Publication Data

US 2007/0276112 A1 Nov. 29, 2007

(51) Int. Cl.
*B02C 19/00* (2006.01)
(52) U.S. Cl. ..................... 241/19; 241/24.17
(58) Field of Classification Search .................. 241/19, 241/24.17, 24.27
See application file for complete search history.

(56) References Cited

U.S. PATENT DOCUMENTS

| | | | | |
|---|---|---|---|---|
| 1,159,137 A | * | 11/1915 | Vecchini | 528/502 C |
| 2,353,482 A | * | 7/1944 | McGavack | 47/10 |
| 4,739,037 A | * | 4/1988 | Kay et al. | 528/493 |
| 5,299,744 A | * | 4/1994 | Garmater | 241/19 |
| 2006/0149015 A1 | * | 7/2006 | Cornish et al. | 528/1 |

* cited by examiner

*Primary Examiner*—Mark Rosenbaum

(57) ABSTRACT

A process of recovering rubber from rubber-bearing plant materials in non-aqueous conditions by first drying the rubber-bearing plant material and then mechanically grinding the rubber-bearing plant material to produce rubber threads and finely ground root tissue. Following the mechanical grinding, rubber threads are separated from finely ground plant root tissue by passing the ground plant material over a dry vibrating mesh screen and blowing away the plant root skins to leave rubber threads. The rubber threads may further be purified by stirring the rubber threads in warm water. Then the mixture is settled and the rubber threads are skimmed off. Optimal purification may be obtained by stirring, settling, and skimming off the rubber threads. Another optimal purification can be achieved by stirring continuously in the flowing warm water.

10 Claims, No Drawings

PROCESS FOR RECOVERING RUBBER FROM RUBBER-BEARING PLANTS WITH A GRISTMILL

FIELD OF THE INVENTION

The present invention relates generally to a process of recovering rubber from rubber-bearing plant materials in non-aqueous conditions by first drying the rubber-bearing plant material and then mechanically grinding the rubber-bearing plant material to produce rubber material as threads and ground plant root tissue. Following the mechanical grinding, the raw rubber material (rubber threads) is separated from the dry and finely ground plant root tissue by passing the rubber threads and ground plant material over a dry vibrating mesh screen and blowing away the plant root skins to leave rubber threads. The rubber threads may further be purified from the residual plant tissue by stirring the rubber threads in warm water, and settling the mixture. During the settlement, the rubber threads float on the surface and the plant tissue debris precipitates. Purified rubber threads are then skimmed off from the surface of the water. Optimal purification may be obtained by stirring, settling, and skimming off the rubber threads.

BACKGROUND OF THE INVENTION

Various methods for recovering rubber from rubber-bearing plant materials are presently known in the art. Most of these currently known processes of rubber extraction from rubber-bearing plants are based on organic solvents and wet-milling with pebble mills.

The earliest industrial processes in this regard were based on solvent extraction from Guayule, a rubber bearing shrub, as described in U.S. Pat. No. 982,373. However, these processes were found to be impractically difficult and expensive.

Similarly, U.S. Pat. No. 1,695,676 describes the use of high pressure gas to break down the cell walls of Guayule. However, the substantial clogging of the extraction equipment with porous fibers, resulting in solvent blockage, has greatly decreased the significance of this process.

In contrast, U.S. Pat. No. 4,136,131 describes the isolation of rubber from rubber-bearing plants by reducing the Guayule shrub in size with an extruder under non-aqueous conditions (based on compressive and shear forces), forming a plastic mass, and flaking the plastic mass, followed by solvent extraction with acetone and cyclohexane. Higher rubber yield can be achieved by this process, however it is impractical in terms of cost-effectiveness. The process is also expensive and uses two expensive solvents which are harmful to the environment and explosive.

U.S. Pat. Nos. 4,526,959 and 4,684,715 each describe a process for rubber extraction from finely ground Guayule shrubs with organic solvents by percolation and monophase solvent systems, in particular the hexane/acetone monophase system. The fundamental problem in solvent extraction of rubber from plant materials is that rubber is a high molecular weight polymer unable to pass cell walls and membranous tissue in solution. This results in impractically slow extraction and very large solvent losses in pilot-plant operations.

Further, scientists have been trying to simulate mastication to extract the rubber in water and have demonstrated significant technologies for rubber recovery via wet-milling by pebble mills. Wet-milling by pebble mills was demonstrated with the Guayule shrub, Russian dandelion (*Taraxacum kok-saghyz*) and other species. Experiments using pebble mills in water, and further purification of rubber "worms" or whole plant, are described in U.S. Pat. Nos. 2,393,035; 2,399,156; 2,434,412; 2,459,369; 2,665,317 and 5,321,111.

Similarly, U.S. Pat. Nos. 2,393,035 and 2,399,156 disclose a process for recovering rubber from *kok-saghyz* and *tau-saghyz* by wet-milling with a pebble mill. Prior to wet-milling, the whole wet or dry roots are leached in hot water to remove carbohydrates, then the roots are extensively pebble milled in water to form a slurry of large tangled clots and crushed plant tissue. Upon dilution with water, this slurry is passed over a wet vibrating screen to separate the plant constituents from large tangled rubber clots. The root skins are then freed from the raw rubber by further pebble milling and waterlogging. The raw rubber obtained contains 10-15% of residual plant debris. Subsequently, this raw rubber is purified from the plant tissue debris by scrubbing in an NaOH solution followed by neutralization of sodium hydroxide with stearic acid.

The foregoing process was demonstrated on a pilot scale. (See RUSSIAN DANDELION (*KOK-SAGHYZ*): *An Emergency Source of Natural Rubber*, Whaley, W. G, Bowen, J. S., United States Department of Agriculture. United States Government Printing Office Washington, Misc. Publication No. 618, Jun. 1947, pages 138-141). However, this process is disadvantageous because it requires additional steps such as: removing carbohydrates in hot water, additional pebble milling and screening steps, an additional pebble mill scrubmilling step, extra drying steps, extra centrifuging, excess use of water, and the use of alkali and an acid that deteriorates the quality of rubber.

Similar processes of recovering rubber from Guayule have been proposed. For example, U.S. Pat. Nos. 2,434,412 and 2,459,369 disclose processes of recovering rubber in the form of "worms" from Guayule shrub by wet-milling with a pebble mill and separating the fibrous matter by flotation. Before wet-milling, the Guayule shrub is parboiled to remove the leaves. The rubber "worms" or whole plant are deresinated by acetone extraction and purified by dissolving in cyclohexane and filtering or centrifuging. This process was demonstrated on a pilot scale at Saltillo, Coahila, Mexico and it is known as the Saltillo process (National Academy of Sciences booklet "Guayule: An Alternative Source of Natural Rubber"). This process is disadvantageous because it requires two more extra steps, such as parboiling and deresination. Moreover, these disadvantages are in addition to the above-mentioned disadvantages of wet-milling with pebble mills.

Further, U.S. Pat. No. 2,665,317 discloses a purification process of rubber "worms" from residual plant tissue debris by scrubmilling in water in the presence of a water-insoluble soap to prevent the agglomeration of rubber "worms". Prior to the purification step, the rubber "worms" were recovered by pebble-milling in water. This process is disadvantageous because the purified rubber "worms" contain more than 20-25% of resin, while further having all the above-mentioned disadvantages of wet-milling.

Furthermore, in U.S. Pat. No. 5,321,111, the whole Guayule shrub was treated with a guanidine salt to soften the tissue for easy hammer milling. The resulting homogenous paste was centrifuged to recover rubber. The forgoing process is disadvantageous because it uses an alkaline substance (guanidine salt) which deteriorates the rubber quality and uses extensive centrifuging to recover the rubber. Moreover, the rubber is not deresinated and contains high amounts of resin.

Accordingly, there are many disadvantages to the previously cited wet-milling processes. For instance, these processes require various unnecessary and costly extra steps such as parboiling, deresination, water washing, addition of alkali and acids, as well as several drying and purification steps. Further, the previously cited wet-milling processes use and waste an excess of water during the wet-milling steps.

Further, the foregoing rubber extraction processes are commercially costly because the extraction steps involve processing the whole plant material in solvent or water which is labor-intensive, time-consuming, expensive, and energy-intensive. Accordingly, there is a need for a process for recovering rubber from rubber-bearing plant materials that is more economical and efficient than those currently known in the art. The present subject matter addresses this need.

SUMMARY OF THE INVENTION

The present subject matter relates generally to methods of recovering rubber from rubber-bearing plants and to purifying the raw rubber material recovered from the plants.

In this regard, a preferred embodiment of the present subject matter relates to a method for recovering rubber from rubber-bearing plant materials in non-aqueous conditions comprising the steps of: drying a rubber bearing plant material, mechanically grinding said rubber bearing plant material to produce rubber threads and finely ground plant root tissue, separating rubber threads from said finely ground plant root tissue by passing said rubber threads and finely ground plant root tissue over a dry vibrating mesh screen, separating said rubber threads from plant root skins by air-blowing, and recovering said rubber threads.

Another preferred embodiment of the present subject matter relates to a method for purifying rubber threads from residual plant tissue debris comprising: stirring said rubber threads in warm water, settling, and skimming off the floating purified rubber threads from the water surface.

DETAILED DESCRIPTION OF THE INVENTION

Definitions

As used herein, the term "biomass" and like terms refer to all of the organic non-fossil material from a plant.

As used herein, the term "biomaterial" and like terms refer to all material found in a plant, excluding rubber.

As used herein, the term "gristmill" and like terms refer to an apparatus which grinds plant biomaterial by means of a rotating stone or disk. A rotating stone or disk may also mean rollers as well as rotating stones or disks. The grinding may refer to grinding or grinding as well as threshing and sorting of the biomaterial. The term gristmill is not meant to be exclusive of any means of powering the rotating disks, stones, or rollers and is meant to include all apparatus which may function equivalently to gristmill as defined above.

As used herein, the term "nip opening" is meant to mean the area where biomass is fed into a gristmill. The term nip opening is meant to include the "hole opening" or "eye opening" where biomass is fed into a gristmill. The term nip opening is the closest opening to the top runner stone.

As used herein, the term "RPM" refers to revolutions per minute.

As used herein, the term "rubber threads" and like terms refer to raw rubber material recovered from a biomass during a milling process. The size of rubber threads can be between 0.5 cm-10 cm long and 0.05 cm-0.2 cm wide. Rubber threads can be extended up to 2-5 times their original length and contain up to 20% of residual plant tissue debris.

As used herein, the terms "top runner stone" and "top rotating stone" are interchangeable and refer to the closest rotating disc, roller, or stone to where the biomass is fed into a gristmill.

As used herein, the term "washing step" may be a separate step to a stirring step, or washing may occur simultaneously and during the step in which rubber threads are stirred in water.

Other terms as used herein are meant to be defined by their well-known meanings in the art.

Process of Recovering Rubber from Rubber Bearing Plants

As discussed herein, it has now unexpectedly been found that a dry-milling process, for example one using a gristmill, can overcome the difficulties and disadvantages observed by the solvent extraction and wet milling processes for recovering rubber from rubber bearing plants.

Accordingly, a preferred aspect of the subject matter expressed herein relates to various methods for recovering rubber from rubber-bearing plant materials by grinding the rubber-bearing plant materials in non-aqueous conditions with a gristmill. In particular, the present subject matter preferably relates to a process for recovering rubber from rubber-bearing plant materials by drying the rubber-bearing plant material, mechanically grinding the rubber-bearing plant materials in non-aqueous conditions to produce rubber threads and finely ground root tissue (biomass), followed by separation of the resulting rubber threads from dry and finely ground plant root tissue by passing over a dry vibrating mesh screen, and then separation of rubber threads from the remaining plant root skins by air-blowing. This permits the recovery of rubber from the rubber bearing plant materials.

Accordingly, the presently preferred methods comprise grinding the rubber-bearing plant materials in a gristmill under non-aqueous conditions. In a particularly preferred embodiment, during the drying step of the above-described process, the rubber-bearing plant material is dried to a moisture content between 0 and 30% water by weight. In a more preferred embodiment, the rubber-bearing plant material is dried to a moisture content of 7.5% water by weight or below.

The grinding of the rubber-bearing plant material may be accomplished in any apparatus capable of gravity (compressive) and rotational-frictional forces. In a preferred embodiment, the grinding is carried out in a gristmill.

In a particularly preferred embodiment, a gristmill with a top runner stone rotating between 100 and 5,000 RMP is used to recover the rubber-bearing plant material.

In another preferred embodiment, the gristmill has a nip opening through which the rubber-bearing plant material is fed to the top runner stone for feeding of the rubber-bearing material into the gristmill. Therefore, yet another presently preferred method comprises enlarging the nip opening from the inside to accommodate chopped roots. In an especially preferred embodiment, the nip opening is enlarged on two sides to form a hemi-cone that is 15 cm wide and 5 cm deep.

One advantage to the present process of dry-milling with a gristmill is that the raw rubber is immediately recovered from the biomass in the form of rubber threads. Accordingly, another presently preferred method involves separating rubber threads from rubber-bearing plant material with vibrating mesh screens, followed by separating the rubber threads from root skins with an air-blower.

The rubber threads formed according to these processes were found to be threadlike in structure providing efficient rubber purification with stirring. In a further especially preferred embodiment, the size of rubber threads is 0.5 to 10 cm in length and 0.05 to 0.2 cm in width (diameter). The rubber threads can be extended up to 3-5 times than original length and can contain 5-20% of residual plant tissue debris. Further, the present processes are faster, more efficient, and more cost effective than existing processes.

Purification of Rubber Threads

Another preferred aspect of the subject matter expressed herein relates to rubber threads which can be purified from the residual plant debris by stirring in warm water, followed by settling, and skimming off the purified rubber threads.

Accordingly, another presently preferred method comprises purifying the rubber threads recovered from the above referenced mechanical gristmilling recovery process by stirring said rubber threads in warm water, followed by settlement, and skimming off purified rubber threads from the water surface. Optimally, this process is conducted using the ratio of the water:rubber threads being 20:1. The water temperature should be between 20° and 100° C. with a water temperature of between 30° and 60° C. being particularly preferred.

Further, the water should be stirred at between 1000 and 100,000 RPM, with stirring at between 22,000 and 50,000 RPM being particularly preferred. In a most preferred embodiment, the stirring is conducted at 35,000 RPM for 2 minutes.

The rubber threads may be stirred in any type of a mixer, stirrer, or blender. A preferred method comprises stirring the rubber threads in a Waring blender. A presently preferred method comprises replacing the typical Waring blender blade with a metal rod. Preferably, the metal rod should be 6 cm in length, 2 cm in width, and 0.2 cm in depth.

In another preferred embodiment, the present purification methods include the further step of waiting for the water and thread mixture to settle, following the stirring procedure as described above. During this settling step, the rubber threads will likely float to the top and the plant tissue debris settles to the bottom. The floated purified rubber threads are skimmed off. The water is decanted without disturbing the precipitated plant tissue debris and can be used in the subsequent stirrings. The remaining plant tissue debris is discarded. In a particularly preferred embodiment, each of these steps should be carried out once for a certain period of time or repeated several times to obtain the purest rubber.

Preventing Agglomeration

In yet another presently preferred method a substance may be added to the water to prevent agglomeration of the rubber threads during stirring. Preferred, non-limiting examples of substances which may be used in this regard include soap, water soluble polymers (surfactants), and mixtures thereof. Particularly preferred water soluble polymers are carboxymethylcelluloses. The most particularly preferred substance is a soap (pH=7; Dove, Fresh touch).

Further, the present methods can be practiced with a large number of plant species bearing rubber and rubber-like hydrocarbons. Preferred, non-limiting examples of such rubber bearing plants include *Taraxacum kok-saghyz, Scorzonera tau-saghyz, Scorzonera Uzbekistanica, Scorzonera taka-saghyz,* Guayule (*Parthenium argentatum*), Rabbit-Brush (*Crysothamnus nauseousus*), Rubbervine (*Cryptostegia grandiflora*), Milkweeds (*Asclepias incarnata, sub-lata, syrica,* et al), Goldenrods (*Solidoago altissima, graminifolia, leavenworthii, rigida,* et al), Sow thistles (*sonchus arvensis, oleraceous,* et al), Rosin weeds (*Silphium* species), Mountain Mints (*Pycnanthemum* species) and *Cacalia atriplicifolia* and mixtures thereof. This list is not meant to be exclusive, and is meant to include any rubber-bearing species with sufficient rubber content to biomass ratio.

Particularly preferred rubber-bearing plants which may be used in the foregoing methods are Russian dandelions, Guayule shrub, and mixtures thereof. Non-limiting examples of Russian dandelions particularly preferred for the foregoing methods include: *Taraxacum kok-saghyz, Taraxacum krimsaghyz, Scorzonera tau-saghyz, Scorzonera Uzbekistanica, Scorzonera taka-saghyz,* and mixtures thereof.

The most particularly preferred examples of Russian dandelions which may be used in the foregoing methods are *Taraxacum kok-saghyz* and *Scorzonera tau-saghyz*. The aforementioned Russian dandelions are some of the most promising sources of natural rubber that can be grown in many countries of the world located in the same parallel with the northern USA and southern Canada.

EXAMPLES

The following examples are illustrative of preferred methods and are not intended to be limitations thereon. All percentages are based on the percent by weight of the final formulations prepared unless otherwise indicated and all totals equal 100% by weight.

Overview of the Examples

Collection of Samples

First, roots of the Russian Dandelion (*Taraxacum kok-saghyz* and *Scorzonera tau-saghyz*) were harvested. These roots were dried at room temperature to a moisture content between 0 and 30% by weight of the dry roots.

Grinding with a Gristmill

Dried roots of *Scorzonera tau-saghyz* were chopped or shredded to between 5 and 15 cm in length (the whole dried roots were used in case of *Taraxacum kok-saghyz*) and fed into a gristmill through a hopper with the top runner stone rotating at 1000 RPM. However, the top runner stone of the gristmill can be rotated at any speed between 100-5,000 RPM for making rubber threads. Further, the weight of the runner stone can be between 10-2,000 kg.

The gravity (compressive) and rotational-frictional forces associated with a gristmill gather (accumulate) the rubber in the plant material as rubber threads by removing them from the plant tissue during the dry-milling with a gristmill.

For better feeding, the nip opening of the top runner stone of the gristmill was made bigger to accommodate the root pieces. The nip opening was enlarged on two sides in the form of a hemi-cone with the size of 15 cm in width and 5 cm in depth.

Separation of Rubber Threads from Biomass

The resulting rubber threads were separated from the dry and finely ground biomass with a vibrating dry mesh screen (mesh size: 2 mm) and further separated from the root skins by air-blowing with an air-blower. 97.5% of the extractable rubber in the roots was recovered via this dry-milling process with a gristmill.

The size of the separated rubber threads can be any size depending on the weight of the rotating top runner stone. Preferably, the rubber threads are between 0.5 and 10 cm in length and between 0.05 and 0.2 cm in width. The washed rubber threads were thread-like in structure which provided efficient rubber purification with stirring. Rubber threads can be extended up to 3 to 5 times their original length and contain 5-20% of residual plant tissue debris.

The biomass contained up to 36% of carbohydrates in *Taraxacum kok-saghyz* and 25% of carbohydrates in *Scorzon-*

*era tau-saghyz*. The residual rubber content of this biomass is 2.5% by weight and it is not economically beneficial to recover. However, the resulting biomass may be used for further ethanol production.

Further Purifying Steps

Separated rubber threads from the biomass and root skins were washed in warm water to remove the dust and easily removable impurities. The amount of water was at least sufficient to cover the rubber threads.

The washed rubber threads were transferred into a "Stirrer" and water was added into the Stirrer. The ratio of water to rubber threads was 20:1 water by weight of the rubber threads. The rubber threads were easily purified from the 5-20% residual plant tissue debris by stirring in warm water at 30-60° C. and at rotations between 1000-100,000 RPM for a short interval.

A small amount of soap (Dove, Fresh touch; pH=7, 1 gram for 2 liters of water) was added into the stirrer in order to form thin films on the rubber threads. The soap prevented agglomeration of the rubber threads during stirring. At higher rotations above 20,000 RPM there was no need to use soap, because rubber the "threads" do not agglomerate when the stirrer is run for short period of time (2 minutes).

During stirring, the temperature of the water was observed to be most desirable between 30-80° C. in order to prevent heat deterioration of the rubber quality. To prevent the agglomeration of rubber-threads without soap, the temperature of water in the Stirrer was kept between 20° and 60° C., during which time the Stirrer ran at 35,000 RPM for 2 minutes. During the first stirring, the main part of the plant tissue debris (60-80%) was removed from rubber threads while stirring at 35,000 RPM for 2 min.

Next, the water and rubber thread mixture was allowed to settle. The removed plant tissue debris precipitated to the bottom of the Stirrer and the rubber threads floated during settling. The floated rubber threads were skimmed off. The water was decanted for subsequent stirrings and the precipitated plant tissue debris was discarded. Subsequent stirring purified the rubber threads up to a rubber purity of 99.8% by weight of rubber to impurities.

Example 1

The following example illustrates the recovery of rubber from *Scorzenera tau-saghyz* with a gristmill. The roots of *Scorzonera tau-saghyz* were harvested from the wild fields in the eastern mountains of Uzbekistan and Kazakhstan. The roots of *Taraxacum kok-saghyz* were harvested from the test plots in Jizzax, Uzbekistan.

The nip opening of the top runner stone of a gristmill were enlarged to 15 cm in width and 5 cm in depth to accommodate the pieces of roots in the form of a hemi-cone on both sides of the upper rotating stone.

The roots were air-dried at room temperature for 30 days and moisture content was 7.5% by weight. 20 kg of dried *tau-saghyz* roots were chopped at 5-15 cm in length (the whole roots were used with *kok-saghyz*) and fed into a gristmill via hopper with the runner stone rotating at 1000 RPM. The weight of the upper rotating stone was about 600 kg.

The resulting rubber threads and ground biomass were separated using a vibrating dry mesh screen (mesh size: 2 mm).

The rubber threads were further separated from the root skins by blowing with an air-blower then washed in water to remove impurities. The size of rubber threads was 0.5 to 10 cm in length and 0.05 to 0.2 cm in width. The structure of rubber threads was threadlike when extended, which provided efficient purification with stirring in warm water at 40-60° C. A small portion of the resulting rubber threads were dried at room temperature and analyzed. The analysis with organic solvents such as acetone and cyclohexane is shown in Table 1.

TABLE 1

Analysis of rubber-threads.

| Rubber threads from: | Rubber content (%) | Acetone solubles (%) | Residual plant tissue debris (%) |
|---|---|---|---|
| *Scorzonera tau-saghyz* | 82 | 3 | 15 |
| *Taraxacum kok-saghyz* | 86 | 4 | 10 |

Example 2

The following example illustrates the purification of rubber in the presence of soap. The rubber threads, (17 g) from Example 1, were placed into the Stirrer and added to 500 ml of warm water (50 C). A small amount of liquid soap (Dove: Fresh Touch), prepared from 1 gram of soap and dissolved in 10 ml of water, was also added. The pH of the soap was pH=7 to avoid an alkali medium.

The Stirrer was run at 35,000 RPM for 2 min. then the mixture was allowed to settle for 5 minutes. The separated plant tissue debris precipitated and the rubber threads floated to the surface during settlement. The floated rubber threads were skimmed off. The water was decanted without disturbing the plant tissue debris in the bottom for the use during subsequent stirrings. The remaining plant tissue was dried and the weight was determined. This procedure was repeated 4 more times to obtain 99.8% pure rubber threads at different stirring periods.

The results are given in Table 2.

TABLE 2

Purification of rubber threads in the presence of a soap

| Stirring # | Stirring period (in min.) | Weight of residual plant tissue debris (*S. tau-saghyz*) in grams | Weight of residual plant tissue debris (*T. kok-saghyz*) in grams |
|---|---|---|---|
| 1 | 2 | 1.5 | 1.2 |
| 2 | 2 | 0.5 | 0.4 |
| 3 | 2 | 0.35 | 0.2 |
| 4 | 3 | 0.25 | 0.1 |
| 5 | 4 | 0.1 | 0.05 |

The rubber purity from *Scorzonera tau-saghyz* was 99.8%. The rubber purity from *Taraxacum kok-saghyz* was 99.8%.

Example 3

The process of Example 2 was modified so that the metal rod in the Stirrer was inserted upside down. The temperature of the water with the rubber threads was kept between 40° and 50° C. with a waterbath, while the stirring was carried out at 10,000 RPM for 5 hours.

Example 4

The process of Example 2 can be carried out using washing machines (for example those found in Laundromats) as the pilot-scale equipment for purifying the rubber.

Example 5

The following example illustrates the preparation of rubber without soap. 17 grams of the rubber threads from Example 1 were placed into the Stirrer and added to 500 ml of warm water. The Stirrer was run at 35,000 RPM for 2 minutes, the plant tissue debris was allowed to settle.

The separated plant debris precipitated and the rubber threads floated to the surface during settlement. The floated rubber threads (slightly tangled) were skimmed off. The water was decanted without disturbing the precipitated plant tissue debris. The water was used for the subsequent stirrings. The plant tissue debris was dried and the weight was determined. This procedure was repeated for 4 more times.

For the continuous experiments, the single stirring step was carried out for 10-15 minutes which provided pure rubber up to 99.2 purity.

After 5 stirring cycles, the rubber threads agglomerated at 60° C. and formed a dense mass of commercial rubber similar to TSR 20. The results are given in Table 3.

TABLE 3

Purification of rubber threads in water

| Stirring # | Period of stirring in minutes | Weight of residual plant tissue debris in grams (*S. tau-saghyz*) | Weight of residual plant tissue debris in grams (*T. kok-saghyz*) |
|---|---|---|---|
| 1 | 2 | 1.3 | 1.3 |
| 2 | 2 | 0.6 | 0.3 |
| 3 | 2 | 0.4 | 0.15 |
| 4 | 3 | 0.3 | 0.15 |
| 5 | 4 | 0.1 | 0.05 |

The rubber purity from *Scorzonera tau-saghyz* was 99.7%. The rubber purity from *Taraxacum kok-saghyz* was 99.75%.

The present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

I claim:

1. A process for recovering rubber from rubber-bearing plant material in non-aqueous conditions comprising the steps of:
    a) drying said rubber-bearing plant material;
    b) feeding said dried material to a gristmill;
    c) grinding said dried material in said gristmill to produce rubber threads and ground plant root tissue;
    d) separating rubber threads from said ground plant root tissue over a dry vibrating mesh screen;
    e) separating said rubber threads from plant root skins by air-blowing;
    f) recovering said rubber threads.

2. The process of claim 1, wherein said rubber threads are 0.5-10 cm long and 0.05-0.2 cm wide, the sizes varying depending on the weights of a runner stone of said gristmill and said plant materials.

3. The process of claim 1, wherein said rubber-bearing plant material is dried to a moisture content between 0 and 30% by weight.

4. The process of claim 3, wherein said dried rubber-bearing plant material is fed into said gristmill having a top runner stone rotating between 10 and 5,000 RPM.

5. The process of claim 4, wherein a nip opening in said top runner stone is modified by enlarging in diameter to accommodate the larger chopped plant roots and shrubs depending on their sizes.

6. The process of claim 5, wherein said nip opening is further enlarged from the underneath of said top runner stone around the proximity of said nip opening for better feeding of the plant roots and shrubs depending on their sizes.

7. The process of claim 1, wherein said gristmill treats said material with gravity, rotational, and compressive forces.

8. The process of claim 7, wherein a runner stone of said gristmill has a weight of between 1-6000 kg.

9. The process of claim 1, wherein said rubber-bearing plant material is selected from the group consisting of Russian dandelions, Guayule shrub, and mixtures thereof.

10. The process of claim 9, wherein said Russian dandelions are selected from the group consisting of *Taraxacum kok-saghyz, Taraxacum krim-saghyz, Scorzonera tau-saghyz, Scorzonera Uzbekistanica, Scorzonera taka-saghyz*, and mixtures thereof.

* * * * *